United States Patent [19]

Haspeslagh et al.

[11] Patent Number: 5,283,300

[45] Date of Patent: Feb. 1, 1994

[54] PROCESS FOR PREPARING POLYOLEFIN FLUFF USING METALLOCENE CATALYST

[75] Inventors: Luc Haspeslagh, Dilbeek; Eric Maziers, Seneffe, both of Belgium

[73] Assignee: Fina Research, S.A., Belgium

[21] Appl. No.: 609,352

[22] Filed: Nov. 5, 1990

[30] Foreign Application Priority Data

Oct. 30, 1989 [EP] European Pat. Off. ........ 89870167.7

[51] Int. Cl.$^5$ .............................................. C08F 2/02
[52] U.S. Cl. ...................................... 526/75; 526/95; 526/114; 526/226; 526/351
[58] Field of Search ................. 526/75, 95, 114, 226, 526/351

[56] References Cited

U.S. PATENT DOCUMENTS 4,767,735 8/1988 Ewen et al. ................. 526/125
4,871,705 10/1989 Hoel ............................ 526/160
4,892,851 1/1990 Ewen et al. .................. 526/160

FOREIGN PATENT DOCUMENTS 0314797 5/1988 European Pat. Off. .
0294942 12/1988 European Pat. Off. .

Primary Examiner—Joseph L. Schofer
Assistant Examiner—Tom Weber
Attorney, Agent, or Firm—Jim D. Wheelington; M. Norwood Cheairs

[57] ABSTRACT

Olefin polymers and copolymers having controlled morphology are prepared by bulk or slurry polymerization using metallocene catalysts in the presence of an alumoxane cocatalyst. Prepolymerization at a temperature of −10° C. to +35° C. during 1.5 to 3.5 minutes is immediately followed by polymerization at 55°-70° C.

The fluff has a narrow grain size distribution, a smooth surface and a high bulk density.

8 Claims, No Drawings

PROCESS FOR PREPARING POLYOLEFIN FLUFF USING METALLOCENE CATALYST

FIELD OF INVENTION

The present invention relates to a process for preparing olefin polymers and copolymers having controlled morphology by bulk or slurry polymerization using homogeneous metallocene catalysts, particularly useful for preparing fluff having a narrow grain size distribution, a smooth surface and a high bulk density.

DESCRIPTION OF PRIOR ART

Traditionally, olefins have been polymerized or copolymerized in the present of hydrocarbon-insoluble catalyst system comprising a transition metal compound and an aluminum alkyl. More recently, active homogeneous non-supported catalyst system comprising a bis(cyclopentadienyl) titanium dialkyl or a bis(cyclopentadienyl) zirconium dialkyl, an aluminum trialkyl and water have been found to be useful for the polymerization of ethylene.

European Patent No. 35,242 discloses a process for preparing ethylene polymers and atactic propylene polymers in the present of a halogen-free Ziegler catalyst system comprising (1) a cyclopentadienyl compound of the formula $(cyclopentadienyl)_n MeY_{4-n}$ in which n is an integer from 1 to 4, Me is a transition metal, especially zirconium, and Y is either hydrogen, a $C_1$-$C_5$ alkyl or metallo alkyl group or a radical having the general formula $CH_2AlR_2$ or $CH_2CH(AlR_2)_2$ in which R represents a $C_1$-$C_5$ alkyl or metallo alkyl group, and (2) an alumoxane. Additional teachings of homogeneous catalyst systems comprising a metallocene and alumoxane are European Patent No. 69,951 and U.S. Pat No. 4,404,344.

An advantage of the metallocene-alumoxane homogeneous catalyst system is the good activity obtained for olefin polymerization. However, metallocene-catalyst system generally suffer from the disadvantage of producing polyolefin fluff having a low bulk density.

It would thus be highly desirable to provide a process for increasing the bulk density of polyolefins prepared by bulk or slurry polymerization using homogeneous metallocene catalysts. Further, the use of decantation legs in some loop reactors also requires the preparation of fluff having controlled morphology, including smooth surface, narrow grain size distribution and apparent high bulk density.

SUMMARY OF THE INVENTION

It is an object of the present invention to provide a process for preparing polyolefin fluff having a narrow grain size distribution.

Another object of the invention is to provide a process for preparing polyolefin fluff particles having a smooth surface.

Still another object of the invention is to provide a process for preparing polyolefin fluff by metallocene catalysts whereby said fluff would have a higher bulk density.

In accordance with the present invention, there is provided a process comprising the steps of:
(i) providing a homogeneous non-supported system comprising a metallocene transition metal catalyst of general formula $(Cp)_m R_n MQ_k$ wherein each Cp is a cyclopentadienyl or a cyclopentadienyl substituted by one or more hydrocarbyl radical such as alkyl, alkenyl, aryl, arylalkyl or alkylaryl radical having from 1 to 20 carbon atoms, R is a structural bridge between two Cp rings, M is a transition metal selected from groups 4 or 5, Q is a hydride or a hydrocarbyl group having from 1 to 20 carbon atoms or an alkenyl group having from 2 to 20 carbon atoms or a halogen, m=1-3 with the proviso that if m=2 or 3 each Cp may be the same or different, n=0 or 1 with the provision that n=0 if m=1, and k is such that the sum of m+k is equal to the oxidation state of M with the proviso that if k is greater than 1 each Q may be the same or different, and an alumoxane cocatalyst; and (ii) prepolymerizing said homogeneous system in the presence of at least one olefin for a period of from 1.5 to 3.5 minutes and at a temperature of from −10° to +35° C.;

(iii) introducing said prepolymerized system either into at least one olefin in the liquid state for bulk polymerization or into an inert liquid hydrocarbon containing at least one olefin for slurry polymerization, the polymerization being carried out at a temperature of from 55° C. to 70° C.; and (iv) recovering polyolefin fluff.

DETAILED DESCRIPTION OF THE INVENTION

The process of the invention may be used in connection with the bulk or slurry polymerization of any olefin or mixture thereof. It is more particularly suitable for the bulk or slurry polymerization of propylene, whether alone or with another olefin copolymer.

One of the surprising aspects of the invention is that using specific sets of values for the operating conditions in the prepolymerization and polymerization steps allows to increase the bulk density of the fluff.

The process of the invention may be used in connection with a wide range of metallocene catalysts. A general formula for describing metallocene catalysts is $(Cp)_m R_n MQ_k$, wherein;

Cp represents a cyclopentadienyl or a cyclopentadienyl substituted by one or more substituents which may be the same or different and which may be attached to a single carbon atom in the cyclopentadiene ring or to two carbon atoms in said ring; as substituents, there may be cited alkyl, alkenyl, aryl, arylalkyl or alkylaryl radicals having from 1 to 20 carbon atoms, like methyl, ethyl, propyl, isopropyl, butyl, butenyl, isobutyl, amyl, phenyl, and the like; preferred Cp are cyclopentadienyl and fluorenyl;

m is equal to 1, 2 or 3, preferably 2, with the proviso that if m=2 or 3 each Cp may be the same or different.

n is equal to 0 or 1, preferably 1, with the proviso that n=0 if m=1;

R is a structural bridge between two Cp rings, preferably selected from the group consisting of dialkylsilicon groups having $C_1$-$C_4$ alkyl substituents which may be the same or different and of alkadiyl radicals having 1 to 4 carbon atoms, most preferably 2,2-propanediyl;

M is a transition metal selected from groups 4 and 5 (formerly groups IVb and Vb), preferably from the group consisting Ti, Zr and Hf;

Q is a hydride or a hydrocarbyl group having from 1 to 20 carbon atoms or an alkenyl group having from 2 to 20 carbon atoms or a halogen, preferably a halogen;

k is such that the sum of m+k is equal to the oxidation state of M, with the proviso that if k is greater than 1 each Q may be the same or different.

The prepolymerization step must be carried out at a temperature sufficiently low so that polymerization does not proceed. That temperature is easily determined by one skilled in the art; it depends on the activity of the catalyst associated with the nature of the olefin monomers present. According to an embodiment of the invention, it is preferred that the prepolymerization temperature should be between −10° C. and +35° C., most preferably between +10° C. and +25° C. The prepolymerization time is not critical; it should be neither too long (else polymerization could proceed) nor too short. According to an embodiment of the invention, it is preferred that polymerization time should be of from 1.5 to 3.5 minutes, preferably from 2 to 3 minutes. A prepolymerization process is disclosed in U.S. Pat. No. 4,767,735 which is hereby incorporated in its entirety by reference.

The polymerization may be carried out in either bulk polymerization or slurry polymerization, in both cases at a temperature of from 55° C. to 70° C., preferably at about 60° C.

According to an embodiment of the invention, polymer deposits on walls may be prevented by addition in the prepolymerization step of an appropriate anti-fouling agent while retaining the narrow grain size distribution.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLES 1 TO 10

The catalyst, isopropenyl fluorenyl cyclopentadienyl zirconium dichloride, was prepared according to method B disclosed in European Patent Application No. 89870079.4, which is hereby incorporated in its entirety by reference and purified. It was dissolved in 5 ml of a 10 wt. % solution of methylalumoxane in toluene, giving a bright violet solution. In the meantime, a small jacketed pressure vessel of 250 ml equipped with an inclined blade stirrer was interconnected with a 4.5 liter stainless steel bench autoclave. The whole system was properly purged with dry pure nitrogen. The 4.5 liter autoclave was filled with 1.5 liter of liquid propylene thermostated at 60° C. while agitating. The 250 ml autoclave was filled with 100 ml liquid propylene and thermostated at 10° or 20° C. while agitating. The pre-contacted catalyst solution was injected through a septum in a valve void on top of the 250 ml vessel and flushed into the 250 ml vessel with 100 ml of liquid propylene. After prepolymerization, the interconnecting valve between the two reactors was opened and the contents of the 250 ml reactor was flushed into the 4.5 liter autoclave with 1.3 liter of liquid propylene. The whole was left polymerizing for 1 hour keeping the temperature constant at 60° C., after which the reaction was stopped by venting off unreacted monomer and the reactor was opened to air. The fluff was dried under reduced pressure at 50° C. overnight. A nice free flowing powder of spherical particles was obtained; the bulk density was measured according to ASTM-D-1898 and the melt flow index (MFI) according to ASTM-D-1238 (2.16 kg/190° C).

The experimental results for examples 1 to 10 are summarized in Table 1. They clearly show that a residence time of about 3 minutes allows obtaining a polymer having the maximum bulk density and narrow grain size distribution.

The distribution of particle size of the fluff was determined by sieving; it is indicated in Table 2.

COMPARATIVE EXAMPLE

The procedure of the examples was followed throughout except for the polymerization temperature which was of 50° C. The experimental results are indicated in Table 1, and the distribution of the particle size of the fluff in Table 2 (Example C).

Obviously, numerous modifications and variations of the present invention are possible in light of the above teachings. It is therefore to be understood that within the scope of the appended claims, the invention may be practiced otherwise than as specifically described herein.

TABLE 1

| Ex No. | Catalyst (mg) | Prepolymerization (min.) | (°C.) | Yield (gr/gr) | MFI (gr/10 min) | Bulk (gr/cm³) |
|---|---|---|---|---|---|---|
| 1 | 1.98 | 5.0 | 20 | 65600 | 4.49 | 0.35 |
| 2 | 1.89 | 3.0 | 20 | 122222 | 3.9 | 0.35 |
| 3 | 2.0 | 2.0 | 20 | 130000 | 4.12 | 0.27 |
| 4 | 2.25 | 1.0 | 20 | 137778 | 4.56 | 0.22 |
| 5 | 2.30 | 0.5 | 20 | 116087 | 4.74 | 0.20 |
| 6 | 2.0 | 4.0 | 10 | 76600 | 5.5 | 0.22 |
| 7 | 1.83 | 3.0 | 10 | 97500 | 4.8 | 0.34 |
| 8 | 2.0 | 2.0 | 10 | 142500 | 4.5 | 0.34 |
| 9 | 2.0 | 1.0 | 10 | 154000 | 5.2 | 0.29 |
| 10 | 2.14 | 0.5 | 10 | 114650 | 5.2 | 0.22 |
| C | 2.0 | 3.0 | 20 | 76800 | 2.46 | 0.08 |

TABLE 2

| | Particle size distribution (wt %) Sieve (mm) | | | | | | |
|---|---|---|---|---|---|---|---|
| | 2.0 | 1.6 | 1.0 | 0.5 | 0.25 | 0.125 | bottom |
| 1 | 12.7 | 1.0 | 18.6 | 62.3 | 3.6 | 1.7 | 0.1 |
| 2 | 4.0 | 0.5 | 7.4 | 87.5 | 0.5 | 0.1 | 0.0 |
| 3 | 19.1 | 6.0 | 46.3 | 25.9 | 1.7 | 0.8 | 0.2 |
| 4 | 18.4 | 24.9 | 49.0 | 4.8 | 1.4 | 1.0 | 0.5 |
| 5 | 47.1 | 26.8 | 14.8 | 7.0 | 2.4 | 1.3 | 0.6 |
| 6 | 52.4 | 18.2 | 9.4 | 10.6 | 6.0 | 9.6 | 3.8 |
| 7 | 1.2 | 0.1 | 5.1 | 93.2 | 0.4 | 0.0 | 0.0 |
| 8 | 8.5 | 4.1 | 54.6 | 31.9 | 0.5 | 0.4 | 0.0 |
| 9 | 62.5 | 19.1 | 14.4 | 2.6 | 0.8 | 0.5 | 0.1 |
| 10 | 57.5 | 17.0 | 15.2 | 6.3 | 2.4 | 1.2 | 0.4 |
| C | 75.5 | 4.4 | 6.3 | 5.3 | 5.4 | 2.3 | 0.8 |

What is claimed as new and desired to be secured by letter of patent of the United States is:

1. Process for the preparation of olefin polymers and copolymers having controlled morphology by bulk or slurry polymerization, comprising the steps of:
   (i) providing a homogeneous non-supported system comprising a metallocene transition metal catalysts of general formula $(Cp)_m R_n MQ_k$ wherein each Cp is a cyclopentadienyl or a cyclopentadienyl substituted by one or more hydrocarbyl radical having from 1 to 20 carbon atoms, R is a structural bridge between two Cp rings, M is a transition metal selected from groups 4 or 5, Q is a hydride or a hydrocarbyl group having from 1 to 20 carbon atoms or an alkenyl group having from 2 to 20 carbon atoms or a halogen, $m=1-3$ with the proviso that if m=2 or 3 each Cp may be the same or different, n=0 or 1 with the proviso that n=0 if m=1, and k is such that the sum of m+k is equal to the oxidation state of M with the proviso that if k is greater than 1 each Q may be the same or different, and an alumoxane cocatalyst; and (ii) prepolymerizing said homogeneous system in the present of at least one olefin for a period of from 1.5 to 3.5 minutes and at a temperature of from $-10°$ to $+35°$ C.;

(iii) introducing said prepolymerized system either into at least one olefin in the liquid state for bulk polymerization or into an inert liquid hydrocarbon containing at least one olefin for slurry polymerization, the polymerization being carried out at a temperature of from 55° C. to 70° C.; and (iv) recovering polyolefin fluff.

2. Process according to claim 1, wherein M is selected from the group consisting of Ti, Zr and Hf.

3. Process according to claim 1, wherein m=2, n=1, the first Cp is cyclopentadienyl, the second Cp is fluorenyl, and R is a 2,2-propanediyl bridge linking the two Cp rings.

4. Process according to claim 1, wherein Q is chlorine.

5. Process according to claim 1, wherein the olefin is propylene.

6. Process according to claim 1, wherein the prepolymerization step is carried out for a period of from 2 to 3 minutes.

7. Process according to claim 1, wherein the prepolymerization step is carried out at a temperature of from $+10°$ C. to $+25°$ C.

8. Process according to claim 1, wherein the polymerization step is carried out at a temperature of about 60° C.

* * * * *